US012224498B2

(12) United States Patent
Hsu et al.

(10) Patent No.: US 12,224,498 B2
(45) Date of Patent: Feb. 11, 2025

(54) WIRELESS RADIATION MODULE AND ELECTRONIC DEVICE USING THE SAME

(71) Applicant: Chiun Mai Communication Systems, Inc., New Taipei (TW)

(72) Inventors: Cho-Kang Hsu, New Taipei (TW); Min-Hui Ho, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 43 days.

(21) Appl. No.: 17/839,717

(22) Filed: Jun. 14, 2022

(65) Prior Publication Data

US 2022/0407224 A1 Dec. 22, 2022

(30) Foreign Application Priority Data

Jun. 21, 2021 (CN) ......................... 202110688131.3

(51) Int. Cl.
*H01Q 1/24* (2006.01)
*H01Q 1/38* (2006.01)
*H01Q 3/24* (2006.01)
*H01Q 21/08* (2006.01)

(52) U.S. Cl.
CPC ............ *H01Q 3/247* (2013.01); *H01Q 1/241* (2013.01); *H01Q 1/38* (2013.01); *H01Q 21/08* (2013.01)

(58) Field of Classification Search
CPC .......... H01Q 3/247; H01Q 1/241; H01Q 1/38; H01Q 21/08; H01Q 3/24; H01Q 5/335; H01Q 1/243; H01Q 1/002; H01Q 1/36; H01Q 5/30; H01Q 23/00; H01Q 25/04
See application file for complete search history.

(56) References Cited

U.S. PATENT DOCUMENTS

| | | | | |
|---|---|---|---|---|
| 8,629,813 | B2 | 1/2014 | Milosavljevic | |
| 9,748,638 | B2 | 8/2017 | Wei et al. | |
| 2011/0102290 | A1* | 5/2011 | Milosavljevic ........ | H01Q 9/145 343/852 |
| 2015/0084817 | A1* | 3/2015 | Yong ...................... | H01Q 5/335 343/702 |
| 2018/0301814 | A1 | 10/2018 | Zhang et al. | |

(Continued)

FOREIGN PATENT DOCUMENTS

| | | |
|---|---|---|
| CN | 101809813 A | 8/2010 |
| CN | 106611897 A | 5/2017 |

(Continued)

*Primary Examiner* — Hai V Tran
*Assistant Examiner* — Michael M Bouizza
(74) *Attorney, Agent, or Firm* — ScienBiziP, P.C.

(57) ABSTRACT

A wireless radiation module with multiple miniaturized antennas receiving signals from multiple switchable feed points for enhanced frequency ranges includes a substrate, a radiation portion, and an active circuit. The radiation portion is spaced apart from a radiator. The radiation portion generates multiple radiation modes through coupling with the radiator, and signals are transmitted and/or received from the radiator. The active circuit is electrically connected to the radiation portion for switching between multiple radiation modes of the radiation portion. The wireless radiation module can operate in multiple radiation modes, and cover multiple frequency bands, to increase a bandwidth and have an improved antenna efficiency. The present disclosure also provides an electronic device with the wireless radiation module.

18 Claims, 17 Drawing Sheets

(56) References Cited

U.S. PATENT DOCUMENTS

| | | | | |
|---|---|---|---|---|
| 2021/0044002 | A1* | 2/2021 | Lee | H01Q 3/34 |
| 2022/0021105 | A1* | 1/2022 | Hsu | H01Q 5/371 |
| 2022/0102859 | A1* | 3/2022 | Dhara | H01Q 9/045 |

FOREIGN PATENT DOCUMENTS

| | | | |
|---|---|---|---|
| CN | 110854507 | A | 2/2020 |
| CN | 112821042 | A | 5/2021 |
| TW | 201709610 | A | 3/2017 |
| TW | 201929322 | A | 7/2019 |

* cited by examiner

WIRELESS RADIATION MODULE AND ELECTRONIC DEVICE USING THE SAME

FIELD

Embodiments of the present disclosure herein generally relates to wireless communications, and, more particularly, to a wireless radiation module and electronic device using the same.

BACKGROUND

With the progress of wireless communication technology, mobile phones, personal digital assistants and other electronic devices offer diversified functions, are lightweight, and are faster and more efficient in data transmission. The space available for the antenna is getting smaller and smaller, and with the continuous development of wireless communication technology, demand for bandwidth is increasing. How to design an antenna with wide bandwidth and better efficiency in a limited space is problematic.

Therefore, improvement is needed.

BRIEF DESCRIPTION OF THE DRAWINGS

Implementations of the present disclosure will now be described, by way of embodiments, with reference to the attached figures.

DETAILED DESCRIPTION

Figure 1:
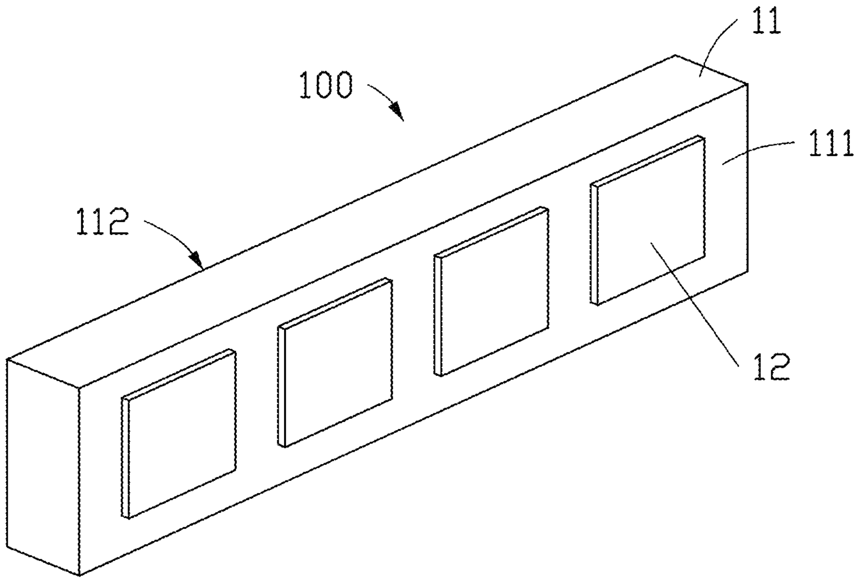
FIG. 1 is a schematic diagram of an embodiment of a wireless radiation module of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
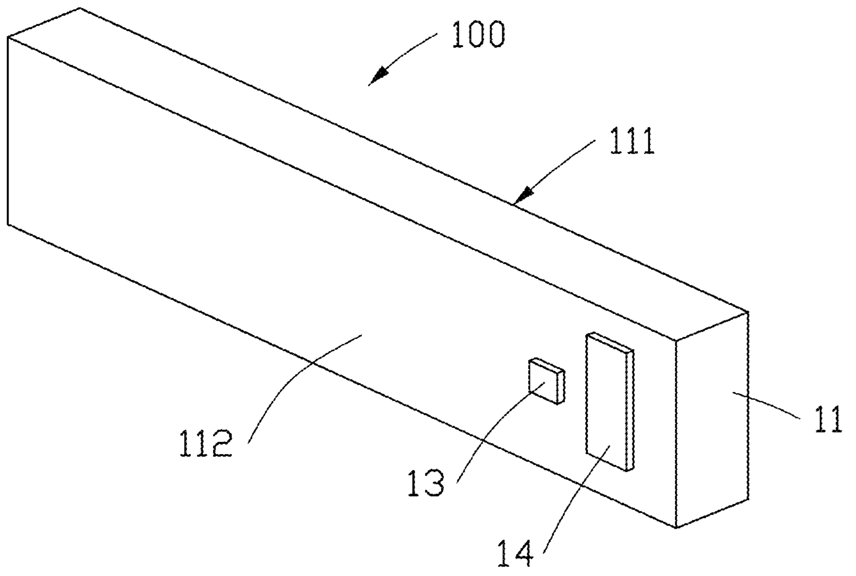
FIG. 2 is a schematic diagram of an embodiment of the wireless radiation module shown in FIG. 1 at another angle.

FIG. 1 and FIG. 2 illustrate a wireless radiation module 100 in accordance with an embodiment of the present disclosure. The wireless radiation module 100 can be applied to any electronic device to transmit and receive radio waves, to exchange signals. In one embodiment, the wireless radiation module 100 may be a radio frequency signal transceiver module.

In the embodiment, the wireless radiation module 100 includes a substrate 11, a radiation portion 12, an active circuit 13, and a connector 14.

The substrate 11 may be a dielectric substrate, such as a printed circuit board (PCB), a ceramic substrate or other dielectric substrate, which is not specifically limited here. The substrate 11 includes a first surface 111 and a second surface 112, and the second surface 112 is arranged opposite to the first surface 111.

In the embodiment, the wireless radiation module 100 includes a plurality of radiation portions. For example, in the embodiment shown in FIG. 1, the wireless radiation module 100 includes four radiation portions 12. The radiation portions 12 are arranged on the first surface 111 of the substrate 11 and are spaced from each other. The radiation portions 12 can be connected to the second surface 112 of the substrate 11 through vias or through holes. In one embodiment, the radiation portions 12 are metal sheets, rectangular and coplanar. The embodiment of the present disclosure does not specifically limit the shape and structure of the radiation portions 12, for example, the shape of the radiation portions 12 may also be circular, square or other shape.

Figure 3:
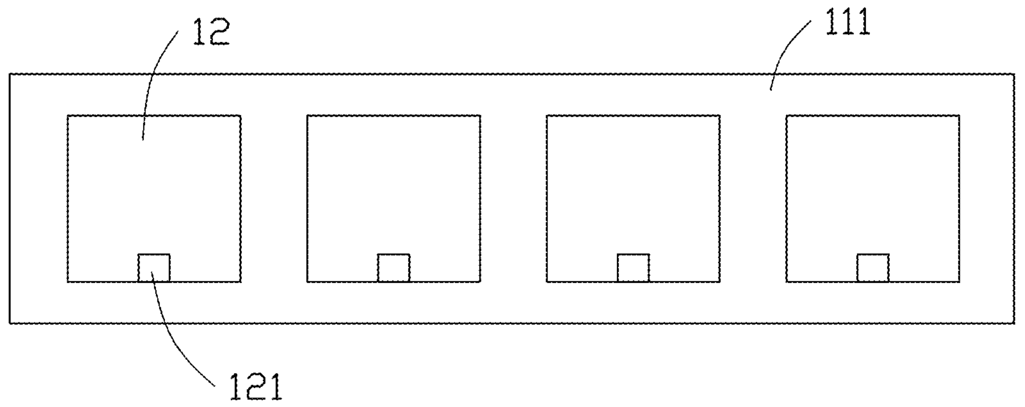
FIG. 3 is a schematic diagram of an embodiment of a radiation portion of the wireless radiation module of the present disclosure.

Referring to FIG. 3, in the embodiment, each radiation portion 12 includes a feed point 121, the feed point 121 is used to electrically connect to a corresponding feed source (not shown) through a matching circuit (not shown), feeding the electrical signal to the corresponding radiation portion 12.

Referring to FIG. 2, in the embodiment, the active circuit 13 is arranged on the second surface 112 of the substrate 11. A connecting line (not shown) is arranged on the second surface 112 of the substrate 11, and the connecting line is connected to the active circuit 13. The active circuit 13 may include a switch and/or other adjustable elements with variable impedance (not shown). The active circuit 13 can be electrically connected to the radiation portion 12 and the connector 14 through the connecting line. For example, in one embodiment, the substrate 11 defines a via (not shown in the figure), and the radiation portion 12 can be connected to the second surface 112 of the substrate 11 through the via, and the radiation portion 12 can be connected to the active circuit 13 through the connecting line on the second surface 112.

The connector 14 is arranged on the second surface 112 of the substrate 11. The connector 14 is arranged on the surface which the active circuit 13 is arranged. In some embodiments, the connectors 14 can be spaced from the active circuit 13 and electrically connected to each other. The embodiment of the present disclosure does not limit the specific positional relationship and connection relationship between the connector 14 and the active circuit 13. For example, in one embodiment, the active circuit 13 can be arranged in the connector 14, and the connector 14 can accommodate the active circuit 13. The connector 14 is electrically connected to the active circuit 13 and connected to the corresponding transmission line. Signal transmission of the wireless radiation module 100, for example, sending or receiving signals, is realized through the transmission line.

It can be understood that the transmission line can be, but is not limited to, a coaxial cable, a flexible printed circuit board (FPCB) or other transmission lines.

Figure 4:
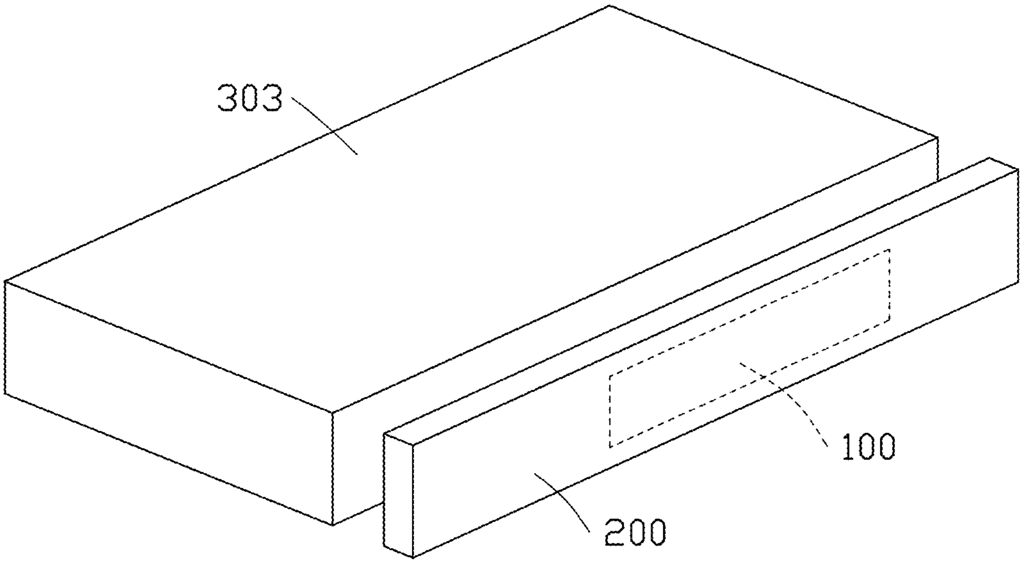
FIG. 4 is a schematic diagram of an embodiment of the wireless radiation module arranged on one side of a radiator of the present disclosure.
Figure 5:
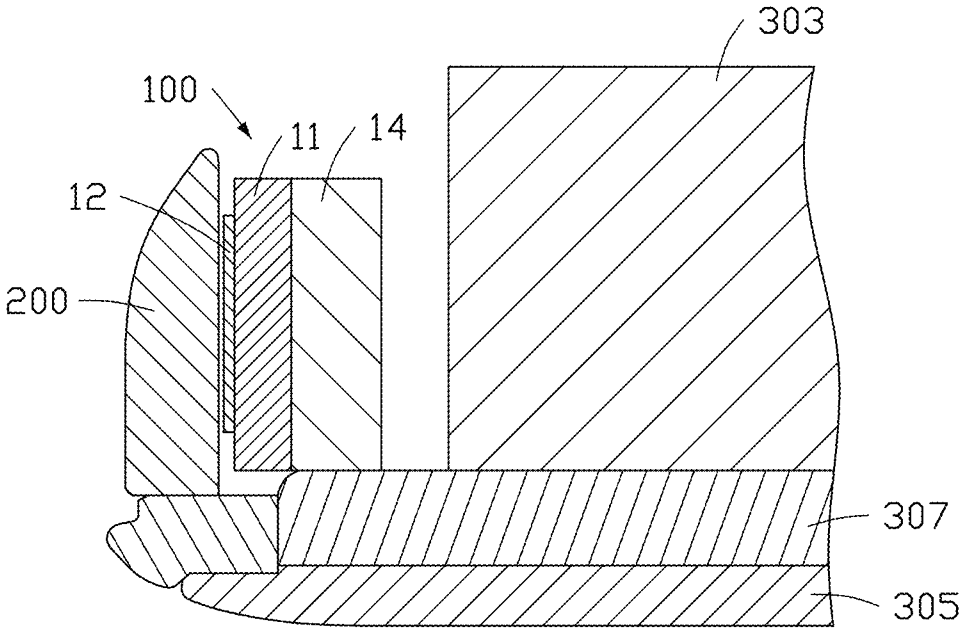
FIG. 5 is a schematic diagram of the wireless radiation module and the radiator shown in FIG. 4 at another angle.

Referring to FIG. 4 and FIG. 5, when the wireless radiation module 100 is used, the wireless radiation module 100 can be arranged on one side of a radiator 200. In one embodiment, the first surface 111 of the substrate 11 is arranged towards the radiator 200. One side of the wireless radiation module 100 where the radiation portion 12 is arranged toward the radiator 200. The radiation portion 12 is used to generate signals to couple the radiator 200 spaced from the radiation portion and transmit and receive signals from the radiator 200. Therefore, signals can be transmitted or received by the radiator 200 through the coupling between the radiation portion 12 and the radiator 200. The wireless radiation module 100 can also utilize the switch of the active circuit 13 and cooperate with a matching circuit to switch between multiple radiation modes, thereby realizing multiple broadband operations.

For example, in one embodiment, when the wireless radiation module 100 includes three radiation portions 12 and is provided with the active circuit 13, the three radiation portions 12 are arranged at intervals, and can be used to receive 4G/5G intermediate frequency (IF) signal (the frequency range is 1.7 GHz-2.2 GHz), high frequency signal (the frequency range is 2.3 GHz-2.7 GHz), ultra-high band (UHB) signal (the frequency range is 3.3 GHz-4.8 GHz), GPS signal (the frequency range is 1.5 GHz-1.6 GHz), and WI-FI signal (the frequency range is 2.4 GHz, 5 GHz).

The embodiment of the present disclosure does not limit the possible frequencies of the wireless radiation module 100. For example, the required frequency can be achieved by adjusting the shape, length, width and other parameters of the wireless radiation module 100. The shape, length, width, and other parameters of the radiation portion 12 can also be adjusted for the required frequency.

In the embodiment, the radiator 200 can be any conductor, such as iron, copper foil on PCB flexible board, conductor in laser direct forming (LDS) process, etc., which is not specifically limited here. For example, in one embodiment, the radiator 200 is a metal frame of an electronic device, and the radiator 200 is arranged on a backplane 305 and spaced from an electronic component (such as battery 303). The wireless radiation module 100 is arranged between the radiator 200 and the battery 303. The battery 303 is arranged on a middle frame 307. The middle frame 307 is arranged on the backplane 305.

In the embodiment, the radiation portion 12 is arranged at intervals from the radiator 200. For example, the radiation portion 12 is arranged parallel to the radiator 200. As another example, the radiation portion 12 is arranged at intervals from the radiator 200, but not parallel to each other. In other embodiment, the radiation portion 12 can also be directly connected or unconnected with the radiator 200. In one embodiment, the radiation portion 12 is arranged at intervals from the radiator 200 and is connected to the radiator 200 through a connecting line. In another embodiment, the radiation portion 12 and the radiator 200 are arranged at intervals, and there is no electrical connection between the radiation portion 12 and the radiator 200.

The embodiment of the present disclosure does not limit the specific structure of the radiator 200 or the connection relationship between the radiator 200 and other elements. For example, the side end of the radiator 200 may be connected to ground (the radiator 200 is thus grounded) or may be unconnected with ground. As another example, there may be or may not be breakpoints, slots, and gaps defined on the radiator 200.

Figure 6:
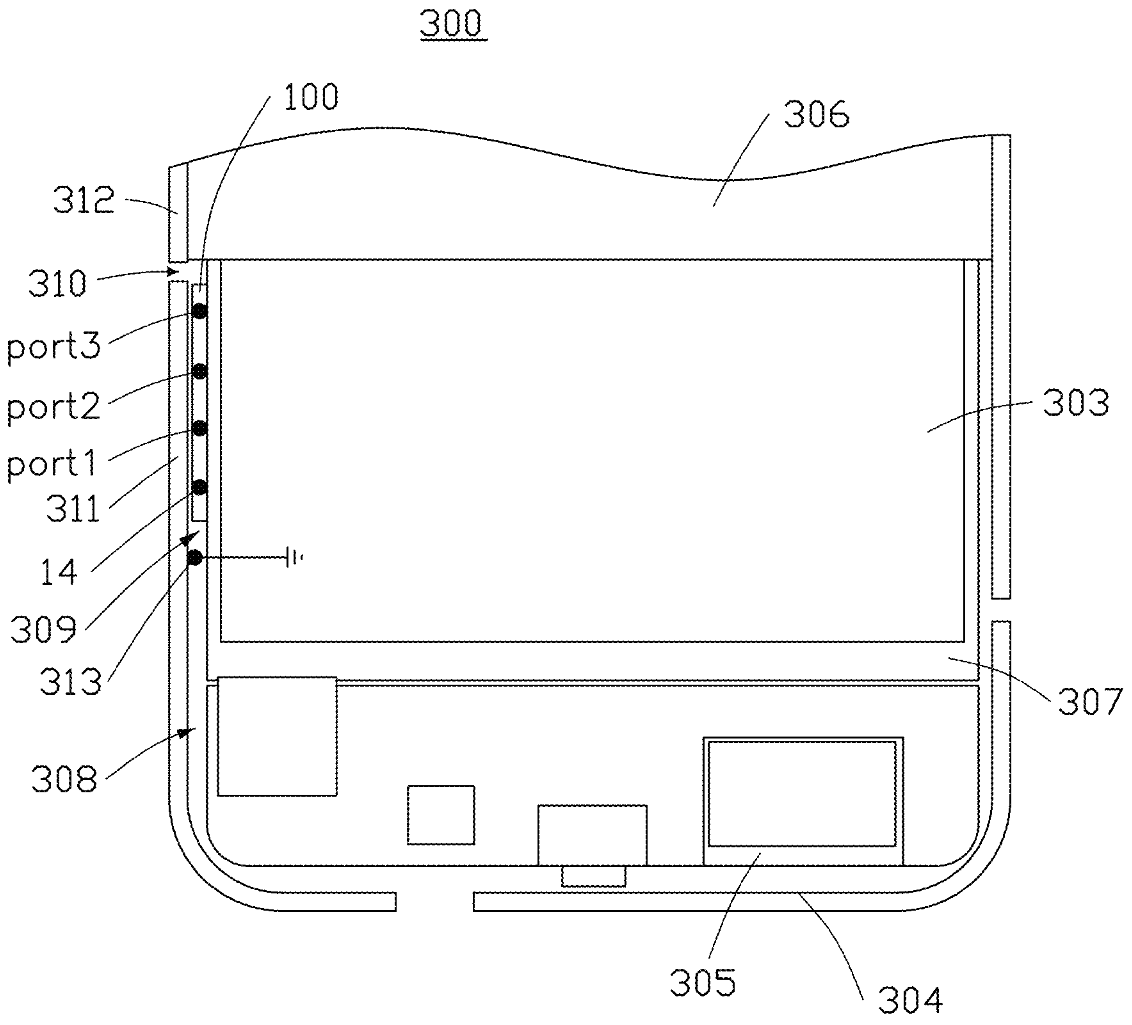
FIG. 6 is a schematic diagram of an embodiment of the wireless radiation module applied to an electronic device of the present disclosure.

Referring to FIG. 6, in the embodiment, the wireless radiation module 100 can be applied to an electronic device 300, and the electronic device 300 can transmit and receive radio waves to transmit and exchange radio signals. The electronic device 300 can be a handheld communication device (such as a mobile phone), a foldable phone, an intelligent wearable device (such as a watch, headphones), a tablet computer, a personal digital assistant (PDA), there are no specific restrictions here.

The electronic device 300 may adopt one or more of the following communication technologies: BLUETOOTH (BT) communication technology, global positioning system (GPS) communication technology, WI-FI communication technology, global system for mobile communications (GSM) communication technology, wideband code division multiple access (WCDMA) communication technology, long term evolution (LTE) communication technology, 5G communication technology, SUB-6G communication technology, and other communication technologies are envisaged.

The embodiment of the present disclosure takes a mobile phone as an example of the electronic device 300.

Referring again to FIG. 6, in one embodiment, the electronic device 300 includes at least a battery 303, a frame 304, a backplane 305, a ground plane 306, and a middle frame 307 (shown in FIG. 5).

The frame 304 is made of metal or other conductive material. The backplane 305 may be made of metal or other conductive material. The frame 304 is arranged on the edge of the backplane 305 and forms a receiving space 308 together with the backplane 305. One side of the frame 304 opposite to the backplane 305 can define an opening (not shown) for receiving a display unit (not shown). The display unit includes a display plane, and the display plane is exposed in the opening. The display unit can be combined with a touch sensor to form a touch screen, the touch sensor can also be called touch panel or touch sensitive panel.

In the embodiment, the display unit has a high screen-size proportion. The area of the display plane of the display unit is greater than 70% of the frontal area of the electronic device, and even a full frontal screen can be achieved. In the embodiment of the present disclosure, the full screen means that the left, right and lower sides of the display unit can be seamlessly connected to the frame 304 except for the necessary buttons or other slots on the electronic device 300.

The ground plane 306 may be made of metal or other conductive material. The ground plane 306 can be arranged in the receiving space 308 surrounded by the frame 304 and the backplane 305, and the ground plane 306 is connected to the backplane 305.

The middle frame 307 is made of metal or other conductive material. The shape and size of the middle frame 307 may be smaller than the ground plane 306. The middle frame 307 is superimposed on the ground plane 306. In the embodiment, the middle frame 307 is a metal sheet arranged between the display unit and the ground plane 306. The middle frame 307 is used to support the display unit, provide electromagnetic shielding, and improve the structural strength of the electronic device 300.

In the embodiment, the frame 304, the backplane 305, the ground plane 306, and the middle frame 307 can form an integrated metal frame. The backplane 305, the ground plane 306 and the middle frame 307 are large areas of metal, and the backplane 305, the ground plane 306, and the middle frame 307 can jointly form a system ground plane (not shown) of the electronic device 300.

The battery 303 is arranged on the middle frame 307 to provide electrical energy for the electronic components, modules, and circuits of the electronic device 300. The battery 303 and the frame 304 are arranged at intervals, and a slit 309 is formed between the battery 303 and the frame 304.

In other embodiment, the electronic device 300 may also include one or more components, such as a processor, a circuit board, a memory, an input/output circuit, an audio component (such as a microphone, a speaker, etc.), a multimedia component (such as a front camera and/or a rear camera). Sensory components (such as proximity sensor, distance sensor, ambient light sensor, acceleration sensor, gyroscope, magnetic sensor, pressure sensor and/or temperature sensor, etc.) can also be included.

When the wireless radiation module 100 is applied to the electronic device 300, the wireless radiation module 100 can be arranged in the slit 309, roughly perpendicular to the plane of the ground plane 306. A part of the frame 304 forms the radiator 200. The frame 304 defines a gap 310 separating and dividing the frame 304 into a first part 311 and a second part 312. The first part 311 forms the radiator 200. The second part 312 may be electrically connected to the system ground, such as the ground 306, and the second part 312 is grounded.

In one embodiment, the gap 310 can be connected to the slit 309 and infilled with insulating materials, such as, but not limited to, plastic, rubber, glass, wood, ceramics, etc.

In one embodiment, a grounding point 313 is defined on the side of the first part 311 (i.e. the radiator 200) away from the gap 310. A first end of the grounding point 313 is electrically connected to the first part 311, and a second end of the grounding point 313 is electrically connected to the middle frame 307, that is, the second end of the grounding point 313 is grounded. The wireless radiation module 100 is arranged in the slit 309 between the gap 310 and the grounding point 313, and the wireless radiation module 100 is roughly perpendicular to the plane of the ground plane 306.

When the wireless radiation module 100 is arranged in the slit 309, the radiation portion 12, which is on the wireless radiation module 100, faces toward the first part 311 and is arranged at intervals from the first part 311. The connector 14 is arranged on the other surface of the substrate 11, the connector 14 is arranged away from the first part 311. One end of the connector 14 is electrically connected to the middle frame 307, and the other end is electrically connected to the substrate 11.

Figure 7:
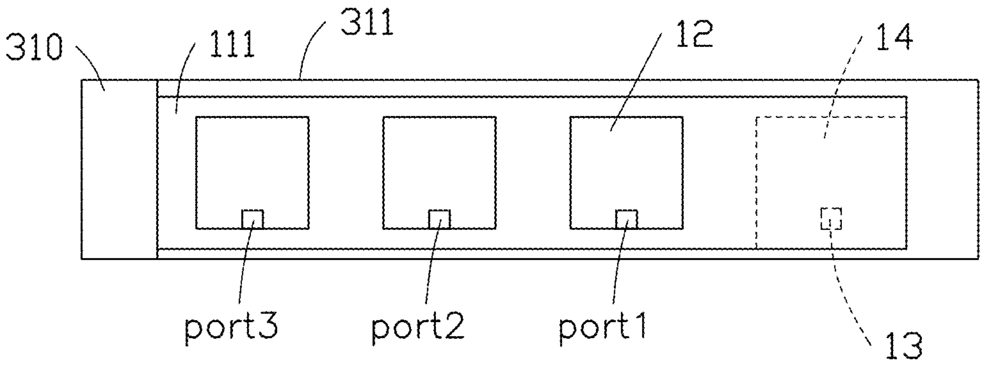
FIG. 7 is a schematic diagram of an embodiment of the wireless radiation module shown in FIG. 6 at another angle.
Figure 8:
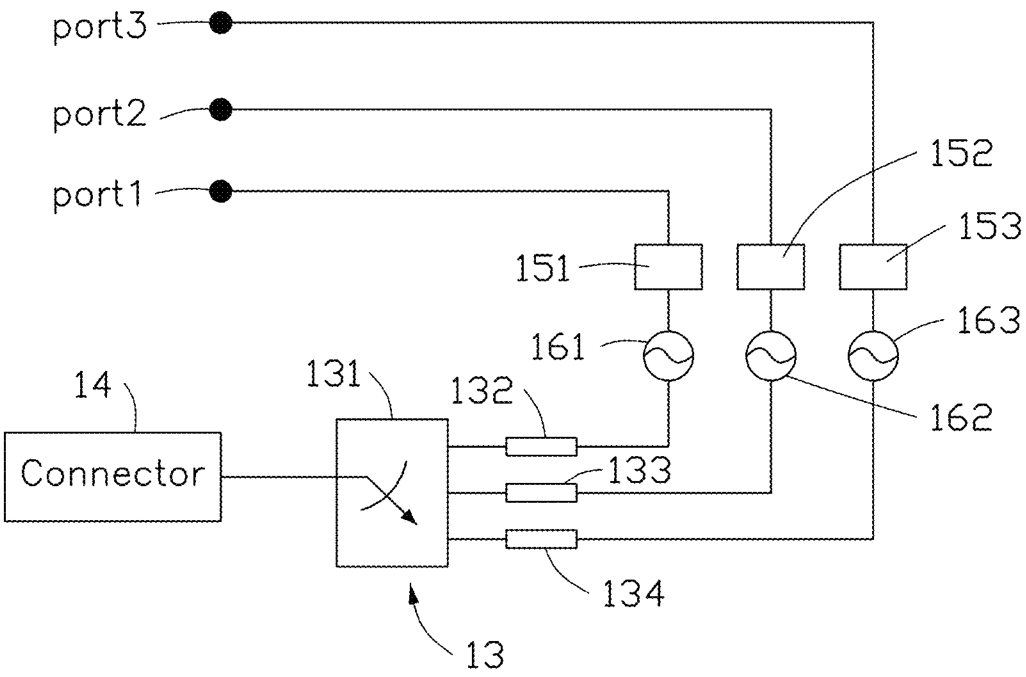
FIG. 8 is a circuit connection diagram of an embodiment of an active circuit in the wireless radiation module shown in FIG. 6.

Referring to FIG. 7 and FIG. 8, in the embodiment, the wireless radiation module 100 includes three radiation portions 12. Each radiation portion 12 includes corresponding feed points (such as feed points port1, port2, and port3). Each feed point is electrically connected to the corresponding feed source through the corresponding matching unit. For example, the matching circuit includes at least a matching unit 151, a matching unit 152, and a matching unit 153. The feed point port1 is electrically connected to the feed source 161 through the matching unit 151. The feed point port2 is electrically connected to the feed source 162 through the matching unit 152. The feed point port3 is electrically connected to the feed source 163 through the matching unit 153.

As shown in FIG. 7, the active circuit 13 in the wireless radiation module 100 is arranged in the connector 14. As shown in FIG. 8, the active circuit 13 includes a switch 131, an adjustable element 132, an adjustable element 133, and an adjustable element 134. One end of the switch 131 is electrically connected to the connector 14, and the other end is electrically connected to the feed sources through the adjustable elements 132, 133, and 134. For example, the switch 131 is electrically connected to the feed source 161 through the adjustable element 132, the switch 131 is electrically connected to the feed source 162 through the adjustable element 133, and the switch 131 is electrically connected to the feed source 163 through the adjustable element 134.

The embodiment of the present disclosure couples the radiation portion 12 with the first part 311 to resonate with adjustable radiation modes. The embodiment of the present disclosure can also control the coupling between two adjacent radiation portions 12 and generate independent radiation modes with adjustable and good antenna efficiency through coupling. The embodiment of the present disclosure can also switch between multiple radiation modes through the switching of the switch 131 in the active circuit 13 and realize multiple radiation frequency band coverage using a plurality of adjustable elements (such as adjustable elements 132, 133, 134).

Figure 9:
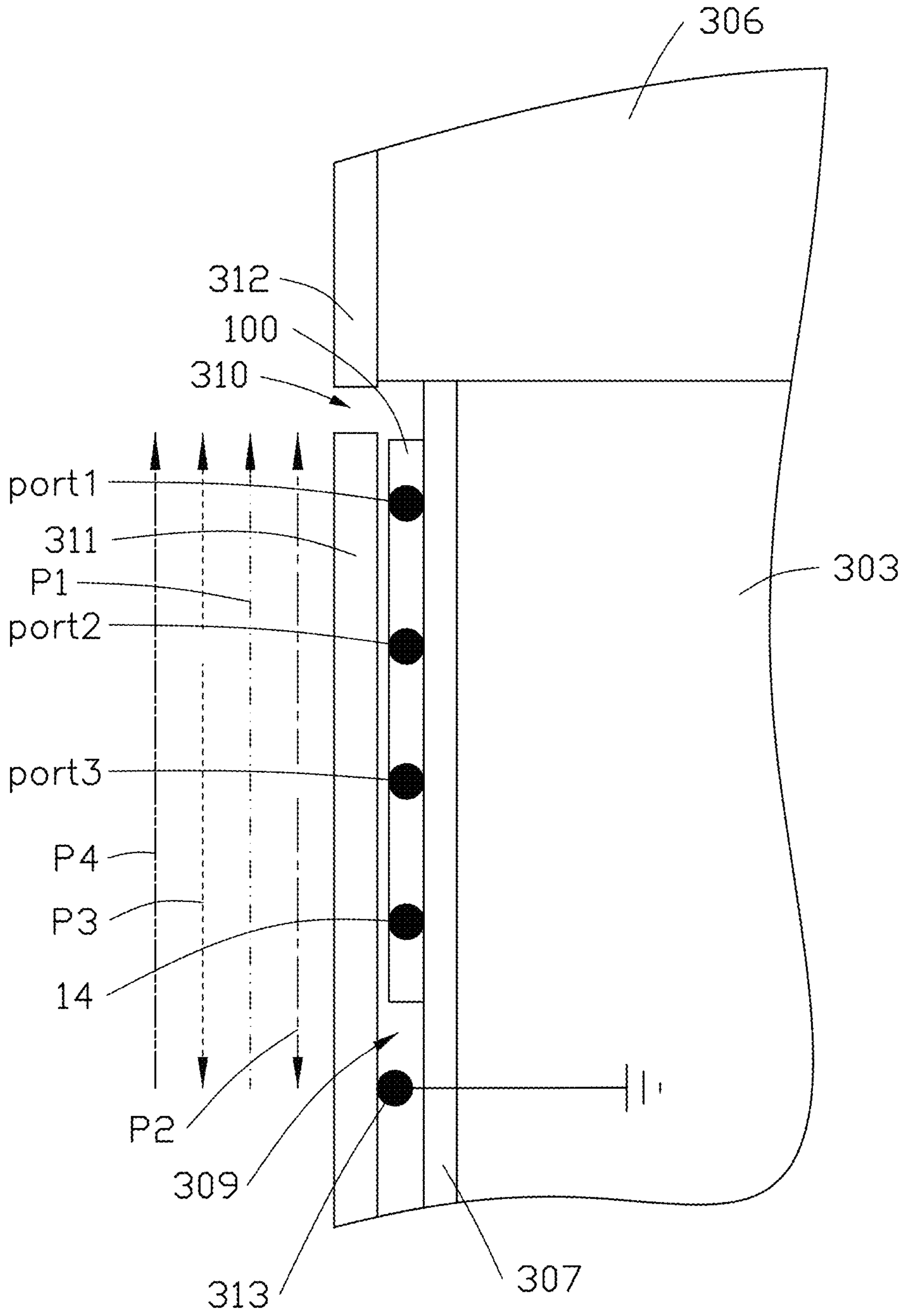
FIG. 9 is a schematic diagram of an embodiment of a path of current of the wireless radiation module shown in FIG. 6.

For example, referring to FIG. 9, current paths of the electronic device 300 are shown.

The radiation portion 12 (the radiation portion 12 provided with the feed point port3 is hereinafter referred to as the first radiation portion for convenience of description) far away from the gap 310 can excite WI-FI 2.4G (shown in path P1), WI-FI 5G (shown in path P2) and license assisted access (LAA) radiation modes. The embodiment of the present disclosure can apply the slit 309 to couple and resonate the WI-FI 2.4G, WI-FI 5G and LAA frequency bands, with the best antenna efficiency, so that the working frequency range of the first radiation portion can cover the WI-FI 2.4G frequency band (2400 MHz-2484 MHz), WI-FI 5G frequency band (5150 MHz-5850 MHz) and LAA frequency band (5150 Mhz-5925 Mhz).

The radiation portion 12 (the radiation portion 12 provided with the feed point port2, hereinafter referred to as the second radiation portion for convenience of description) located in the middle can excite the ultra-high frequency (UHB) radiation mode and 5G Sub 6 NR radiation mode (shown in path P3). The embodiment of the present disclosure can apply the slit 309 to couple and resonate the UHB band and 5G Sub 6 NR band, with the best antenna efficiency, so that the working frequency range of the second radiation portion can cover the UHF band (3400 MHz-3800 MHz) and 5G Sub 6 NR band (for example, 5G Sub6 N77 band (3300 Mhz-4200 Mhz), 5G Sub 6 N78 band (3300 MHz-3800 MHz) and 5G Sub 6 N79 band (4400 MHz-5000 MHz).

The radiation portion 12 (the radiation portion 12 provided with the feed point port1, is hereinafter referred to as the third radiation portion for convenience of description) close to one side of the gap 310 can excite the medium and high frequency radiation modes (shown in path P4). The embodiment of the present disclosure can apply the slit 309 to couple and resonate the medium and high radiation frequency band, with the best antenna efficiency. The working frequency range of the third radiation portion can cover the medium frequency GSM1800/1900/WCDMA2100 radiation frequency band (1710 MHz-2170 Mhz) and the high frequency LTE B7, B40 and B41 radiation frequency bands (2300 Mhz-2690 MHz).

The switch 131 is a switch for medium and high frequency, UHB and NR, and WI-FI 2.4G WI-FI 5G and LAA, the switch 131 is used to switch between medium and high frequency, UHB and NR, and WI-FI 2.4G WI-FI 5G and LAA radiation frequency bands.

The wireless radiation module 100 of the present disclosure can be applied to the electronic device 300 to improve the antenna efficiency bandwidth and have the best antenna efficiency, and the switching provided by the switch 131 can effectively improve the antenna frequency coverage. In one embodiment, the working frequency range applicable to the wireless radiation module 100 covers medium frequency 1710 MHz to 2170 MHz, high frequency 2300 MHz-2690 MHz, UHF 3400 MHz to 3800 MHz, WI-FI 2.4G and 5G; and LAA, and can support 5G Sub6 N77/N78/N79 radiation frequency bands.

The wireless radiation module 100 sets a corresponding feed point at the appropriate position of the radiation portion 12, and uses the radiator 200 (which can also be the metal frame of the electronic device 300, such as the first part 311) as the metal radiator, and the radiation mode is achieved by coupling the radiator 200 with the wireless radiation module 100 in the slit 309. This covers medium, high frequency, ultra-high frequency, 5G Sub 6 N77, 5G Sub 6 N78, 5G Sub 6 N79, WI-FI 2.4G and 5G frequency bands, so as to greatly improve their bandwidth and antenna efficiency, it can also cover the applications of 5G communication frequency bands commonly used in the world and the requirements of carrier aggregation (CA) supporting LTE-A (short name for LTE Advanced, which is the subsequent evolution of LTE technology).

Figure 10:
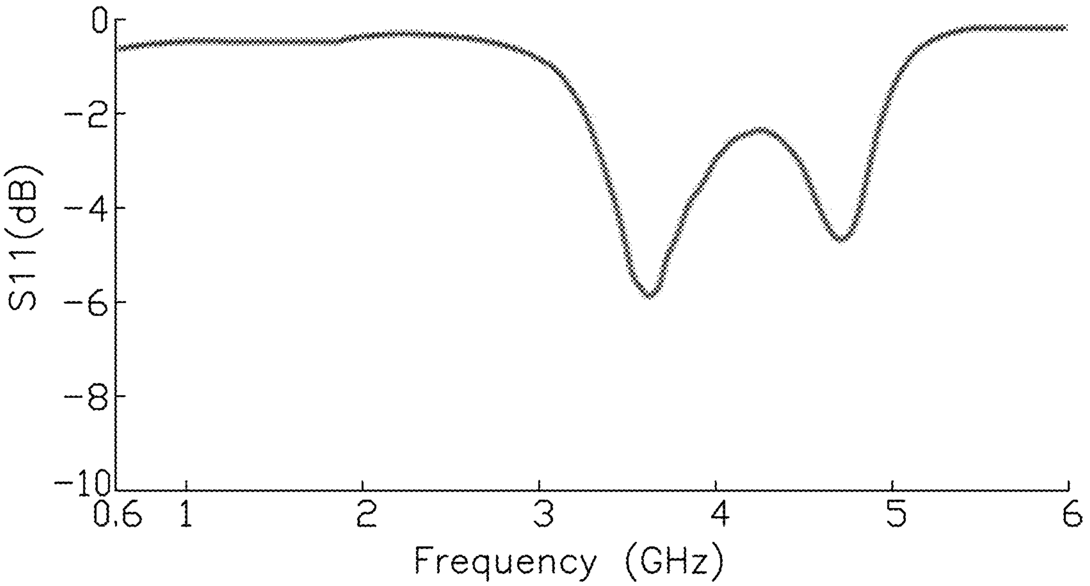
FIGS. 10-13 are graphs of S parameters (scattering parameters) of the wireless radiation module shown in FIG. 6.
Figure 11:
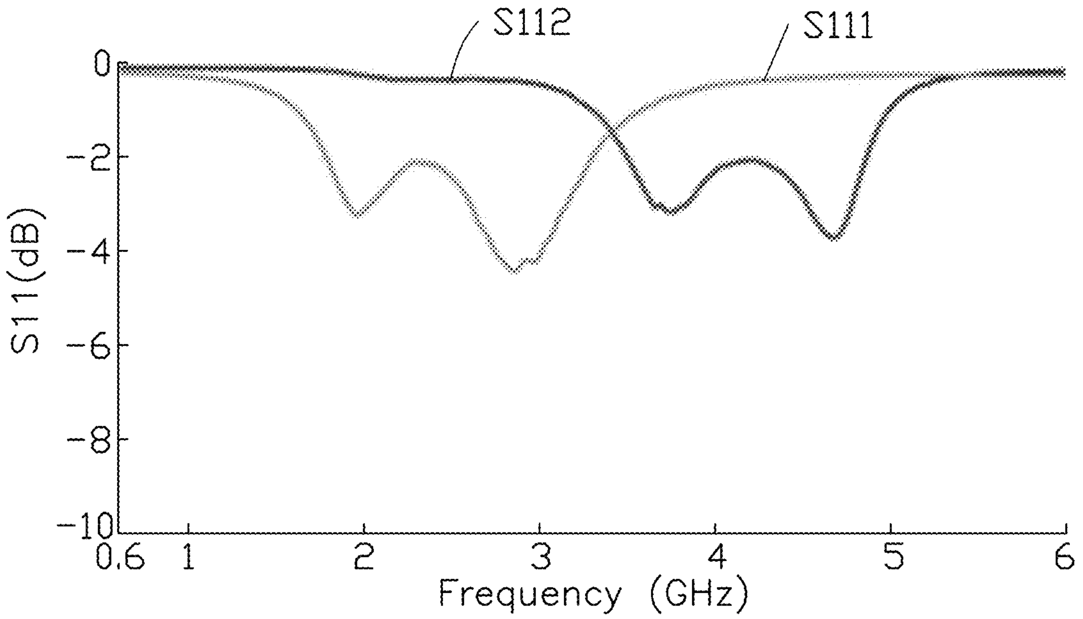
Figure 12:
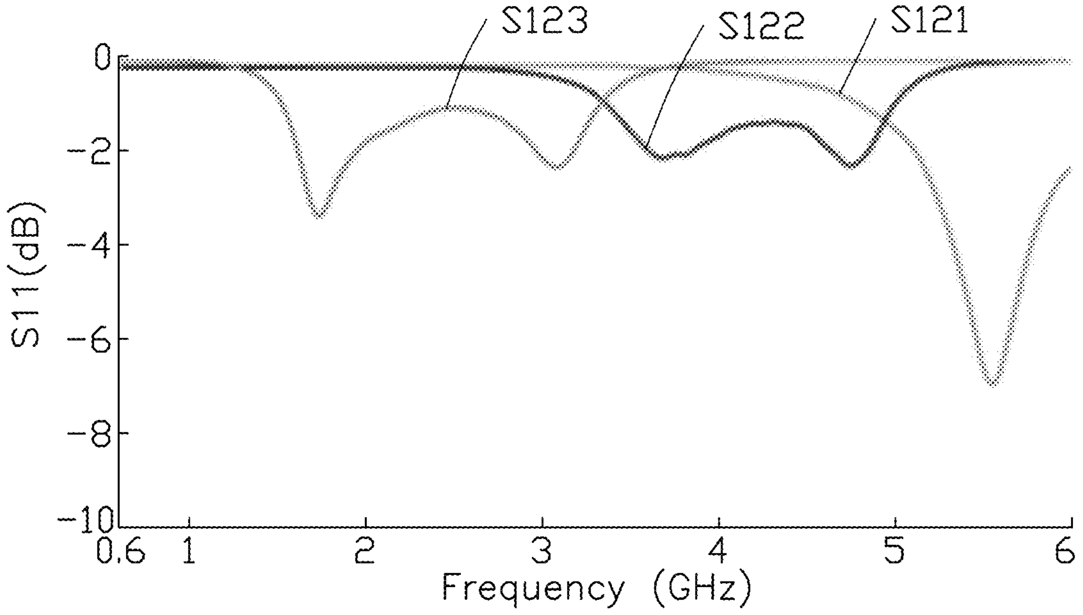
Figure 13:
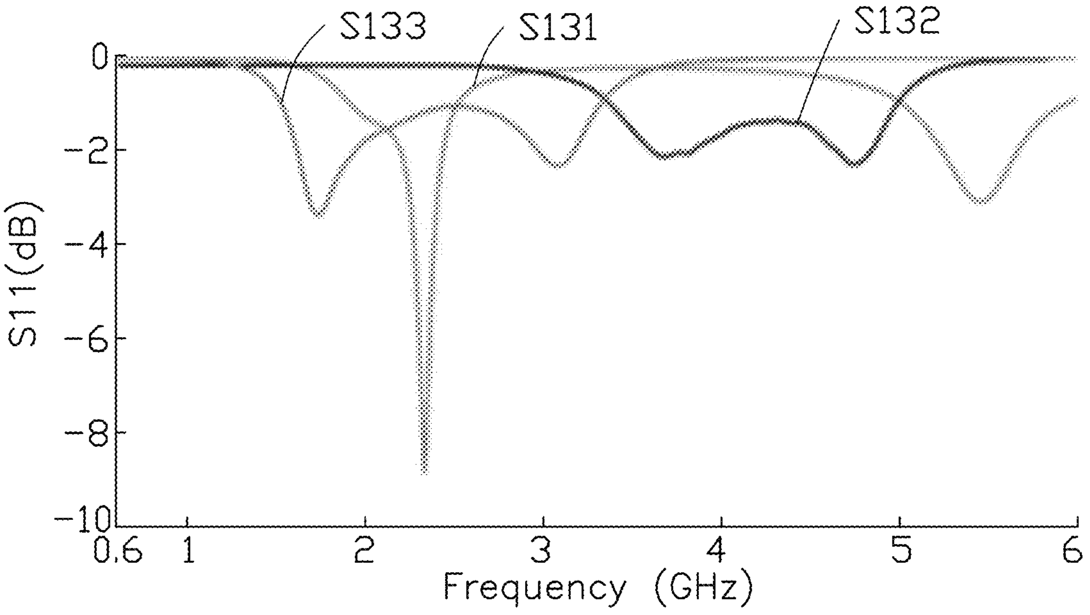

FIGS. 10-13 show graphs of S parameters (scattering parameters) when the wireless radiation module 100 is provided with three radiation portions. FIG. 10 is a graph of S parameters of the second radiation portion in the wireless radiation module 100. FIG. 11 is a graph of S parameters of the second radiation portion and the third radiation portion in the wireless radiation module 100. The curve S111 is the S11 value of the second radiation portion in the wireless radiation module 100. The curve S112 is the S11 value of the third radiation portion in the wireless radiation module 100. FIG. 12 is a graph of S parameters of the first radiation portion, the second radiation portion and the third radiation portion in the wireless radiation module 100. The curve S121 is the S11 value of the first radiation portion in the wireless radiation module 100. The curve S122 is the S11 value of the second radiation portion in the wireless radiation module 100. The curve S123 is the S11 value of the third radiation portion in the wireless radiation module 100. FIG. 13 is a graph of S parameters when the wireless radiation module 100 is provided with three radiation portions and another matching circuit is adopted. The curve S131 is the S11 value of the first radiation portion in the wireless radiation module 100. The curve S132 is the S11 value of the second radiation portion in the wireless radiation module 100. The curve S133 is the S11 value of the third radiation portion in the wireless radiation module 100.

Figure 14:
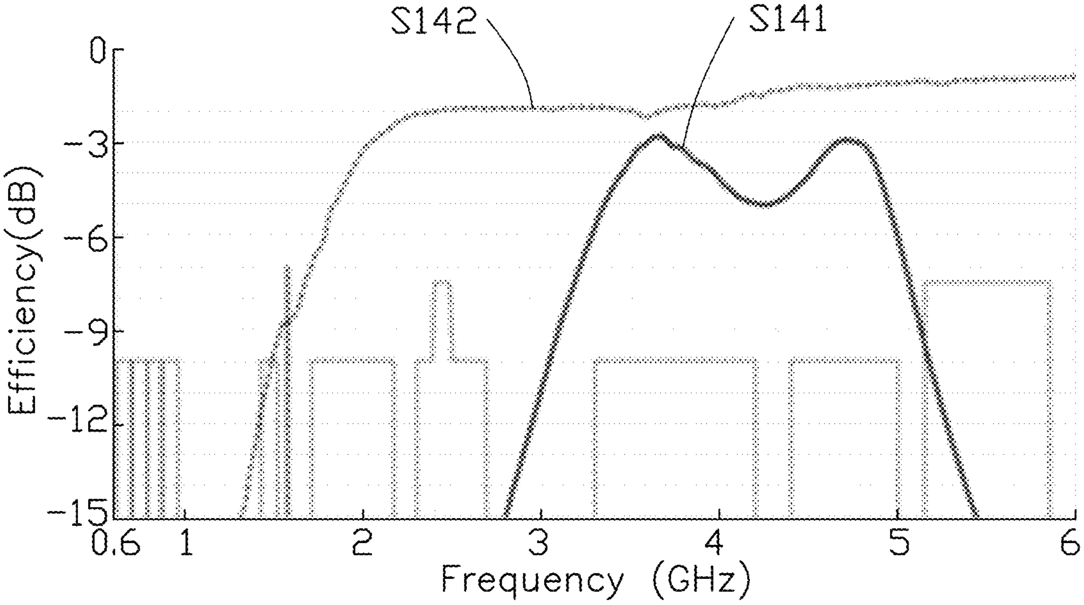
FIGS. 14-17 are efficiency curves of the wireless radiation module shown in FIG. 6.

FIGS. 14-17 are graphs showing efficiency curves when the wireless radiation module 100 is provided with three radiation portions. FIG. 14 is a graph showing efficiency curve of the second radiation portion in the wireless radiation module 100. The curve S141 is the total efficiency value of the second radiation portion in the wireless radiation module 100. The curve S142 is the radiation efficiency value of the second radiation portion in the wireless radiation module 100.

Figure 15:
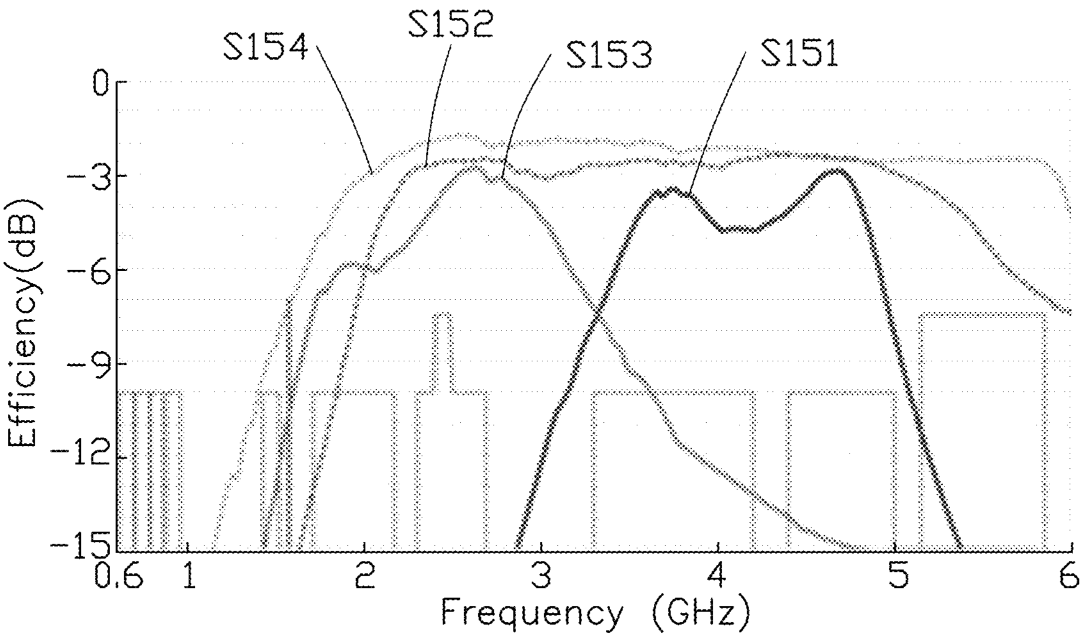

FIG. 15 is a graph showing efficiency curve of the second radiation portion and the third radiation portion in the wireless radiation module 100. The curve S151 is the total efficiency value of the second radiation portion in the wireless radiation module 100. The curve S152 is the radiation efficiency value of the second radiation portion in the wireless radiation module 100. The curve S153 is the total efficiency value of the third radiation portion in the wireless radiation module 100. The curve S154 is the radiation efficiency value of the third radiation portion in the wireless radiation module 100.

Figure 16:
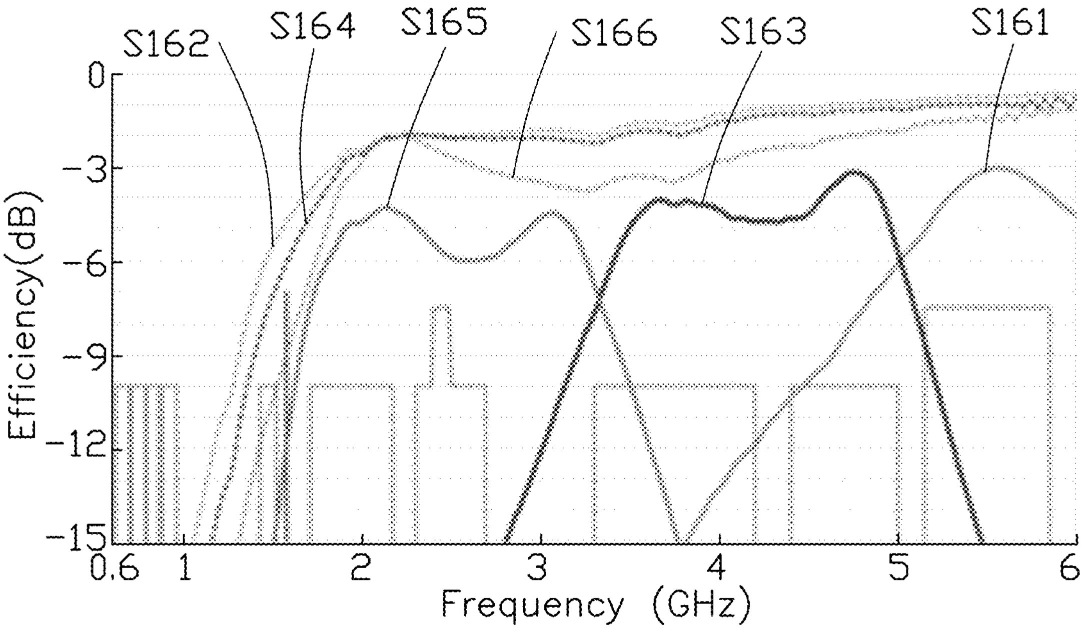

FIG. 16 is a graph showing efficiency curve of the first radiation portion, second radiation portion and third radiation portion in the wireless radiation module 100. The curve S161 is the total efficiency value of the first radiation portion in the wireless radiation module 100. The curve S162 is the radiation efficiency value of the first radiation portion in the wireless radiation module 100. The curve S163 is the total efficiency value of the second radiation portion in the wireless radiation module 100. The curve S164 is the radiation efficiency value of the second radiation portion in the wireless radiation module 100. The curve S165 is the total efficiency value of the third radiation portion in the wireless radiation module 100. The curve S166 is the radiation efficiency value of the third radiation portion in the wireless radiation module 100.

Figure 17:
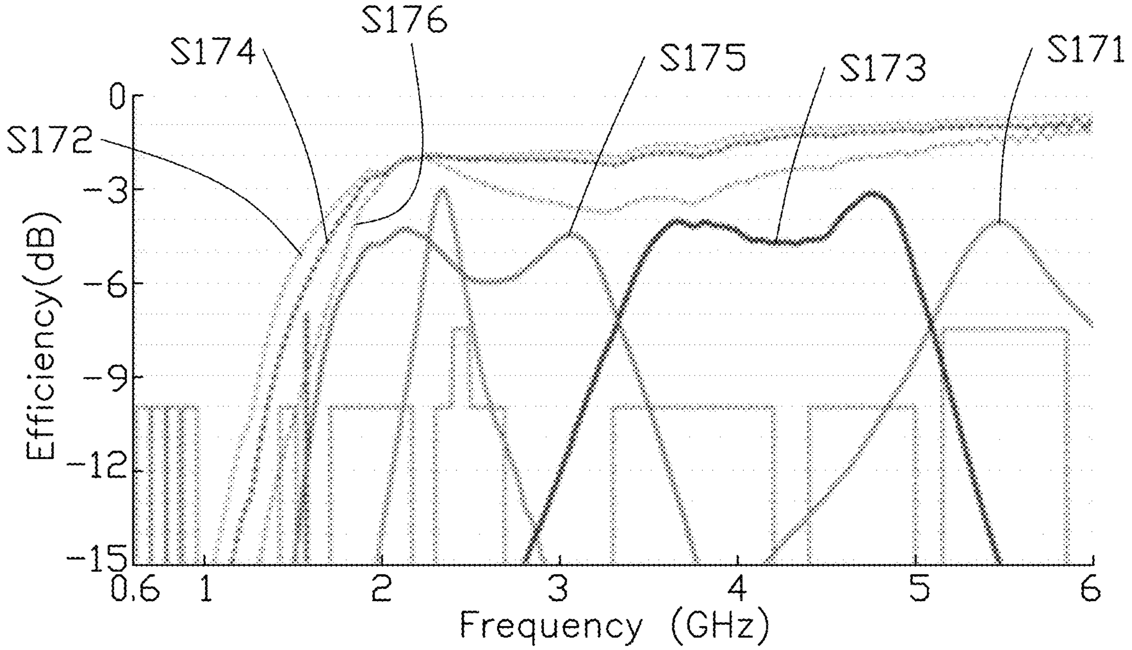

FIG. 17 is an efficiency curve when the wireless radiation module 100 is provided with three radiation portions and another matching circuit is adopted. The curve S171 is the total efficiency value of the first radiation portion in the wireless radiation module 100. The curve S172 is the radiation efficiency value of the first radiation portion in the wireless radiation module 100. The curve S173 is the total efficiency value of the second radiation portion in the wireless radiation module 100. The curve S174 is the radiation efficiency value of the second radiation portion in the wireless radiation module 100. The curve S175 is the total efficiency value of the third radiation portion in the wireless radiation module 100. The curve S176 is the radiation efficiency value of the third radiation portion in the wireless radiation module 100.

The present disclosure controls the frequency radiation mode by setting the switch 131 to switch to different feed points, so as to cover the medium frequency (1710 MHz-2170 MHz), high frequency (2300 MHz-2690 MHz), UHF (3400 MHz-3800 MHz), WI-FI 2.4G and 5G and LAA, and can support 5G Sub 6 N77/N78/N79 radiation frequency bands.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the exemplary embodiments described above may be modified within the scope of the claims.

What is claimed is:

1. A wireless radiation module applied in an electronic device having a radiator, comprising:

a substrate having a first surface and a second surface opposite to the first surface;

a radiation portion configured to generate signals in multiple radiation modes; and an active circuit arranged on the second surface of the substrate, electrically connecting to the radiation portion, and configured to switch the multiple radiation modes, wherein the radiation portion is configured to generate signals to couple the radiator spaced apart from the radiation portion, and transmit and receive signals through the radiator, and the first surface is arranged toward the radiator, the radiation portion is arranged on the first surface, the radiation portion is arranged relative to the radiator, the radiation portion comprises a feed point electrically connected to a corresponding feed source, the feed point is configured to feed current to the radiation portion, and the radiation portion is configured to couple the current to the radiator.

2. The wireless radiation module according to claim 1, further comprising a connector arranged on the second surface of the substrate, the connector electrically connecting to the active circuit with a transmission line.

3. The wireless radiation module according to claim 2, wherein the radiation portion comprises a plurality of radiation portions arranged at intervals, the feed point is electrically connected to a corresponding feed source through a corresponding matching unit.

4. The wireless radiation module according to claim 3, wherein the active circuit comprises a switch and a plurality of adjustable elements, a first end of the switch electrically connects to the connector, and a second end of the switch electrically connects to the corresponding feed source through a corresponding adjustable element, the switch is switched to the corresponding adjustable element and the corresponding feed source to switch the multiple radiation modes.

5. The wireless radiation module according to claim 1, wherein the radiation portion comprises three radiation portions arranged at intervals, the three radiation portions couple the radiator to generate the multiple radiation modes by adjusting coupling states of the three radiation portions.

6. The wireless radiation module according to claim 5, wherein the radiation modes comprise WI-FI 2.4G radiation mode, WI-FI 5G radiation mode, Licensed Spectrum Assisted Access (LAA) radiation mode, Ultra High Frequency (UHB) radiation mode, 5G Sub 6 NR radiation mode and mid-high frequency radiation mode.

7. An electronic device comprising:

a radiator;

a wireless radiation module comprising:

a substrate comprising a first surface and a second surface opposite to the first surface;

a radiation portion configured to generate signals in multiple radiation modes; and an active circuit arranged on the second surface of the substrate, electrically connecting to the radiation portion, and configured to switch the multiple radiation modes;

wherein the radiation portion is configured to generate signals to couple the radiator spaced from the radiation portion, and transmit and receive signals from the radiator, and the first surface is arranged toward the radiator, the radiation portion is arranged on the first surface, the radiation portion is arranged relative to the radiator, the radiation portion comprises a feed point electrically connected to a corresponding feed source, the feed point is configured to feed current to the radiation portion, and the radiation portion is configured to couple the current to the radiator.

8. The electronic device according to claim 7, further comprising a metal frame, wherein a part of the metal frame forms the radiator.

9. The electronic device according to claim 8, wherein a gap is defined on the metal frame and divides the metal frame into a first part and a second part arranged at intervals, the first part forms the radiator, and the second part is grounded.

10. The electronic device according to claim 9, further comprising a grounding point defined on a side of the first part away from the second part, wherein a first end of the grounding point electrically connects to the first part, and a second end of the grounding point is grounded.

11. The electronic device according to claim 10, further comprising a battery, wherein a slit is formed between the battery and the metal frame is spaced from the battery.

12. The electronic device according to claim 11, wherein the wireless radiation module is arranged in the slit between the gap and the grounding point, and the radiation portion is arranged at an interval from the first part.

13. The electronic device according to claim 7, the wireless radiation module further comprising a connector arranged on the second surface of the substrate and electrically connecting to the active circuit with a transmission line.

14. The electronic device according to claim 13, wherein the first surface of the substrate is arranged toward the radiator.

15. The electronic device according to claim 13, wherein the radiation portion comprises a plurality of radiation portions arranged at intervals, the feed point is electrically connected to a corresponding feed source through a corresponding matching unit.

16. The electronic device according to claim 15, wherein the active circuit comprises a switch and a plurality of adjustable elements, a first end of the switch electrically connects to the connector, and a second end of the switch electrically connects to the corresponding feed source through a corresponding adjustable element, the switch is switched to the corresponding adjustable element and the corresponding feed source to switch the multiple radiation modes.

17. The electronic device according to claim 7, wherein the radiation portion comprises three radiation portions arranged at intervals, the wireless radiation module excites the multiple radiation modes by coupling the three radiation portions to the radiator, and/or adjusting coupling states between two adjacent radiation portions.

18. The electronic device according to claim 17, wherein the multiple radiation modes comprise WI-FI 2.4G radiation mode, WI-FI 5G radiation mode, Licensed Spectrum Assisted Access (LAA) radiation mode, Ultra High Frequency (UHB) radiation mode, 5G Sub6 NR radiation mode and mid-high frequency radiation mode.

* * * * *